United States Patent

[11] 3,623,814

| [72] | Inventor | Carl F. Buhrer<br>Oyster Bay, N.Y. |
|---|---|---|
| [21] | Appl. No. | 811,804 |
| [22] | Filed | Apr. 1, 1969 |
| [45] | Patented | Nov. 30, 1971 |
| [73] | Assignee | General Telephone & Electronics Laboratories, Inc. |

[54] LIGHT BEAM DEFLECTION SENSOR
11 Claims, 19 Drawing Figs.

[52] U.S. Cl.............................. 356/114,
250/225, 350/157, 356/152
[51] Int. Cl......................................G01b 11/26
[50] Field of Search..........................356/114–119,
152; 350/152, 157; 250/225;
329/144

[56] References Cited
UNITED STATES PATENTS

| 2,622,470 | 12/1952 | Rines | 356/114 |
|---|---|---|---|
| 2,976,764 | 3/1961 | Hyde et al. | 356/116 |
| 3,296,921 | 1/1967 | Polster | 356/114 |
| 3,401,590 | 9/1968 | Massey | 350/157 |
| 3,409,781 | 11/1968 | Immarco et al. | 356/117 |
| 3,442,571 | 5/1969 | Itzkan | 350/152 |
| 3,450,477 | 6/1969 | Meltzer | 356/114 |

Primary Examiner—Ronald L. Wibert
Assistant Examiner—J. Rothenberg
Attorney—Irving M. Kriegsman ABSTRACT: A deflection sensing system for measuring the deflection of a collimated beam of light having a component of plane polarized light. A wedge of birefringent crystal with thickness varying linearly in the direction of deflection of the beam is positioned in the path of the beam. The beam of light emerging from the wedge contains a continuously changing degree of elliptical polarization. The amount and direction of change in elliptical polarization which is proportional to the amount and direction of deflection of the light beam is then measured.

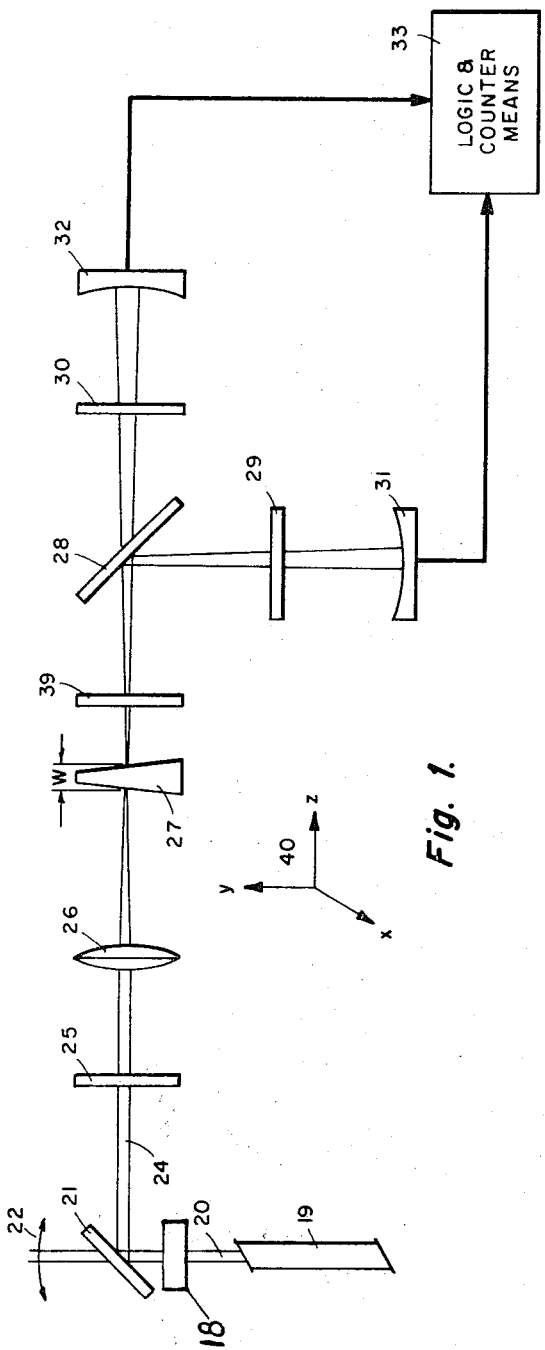
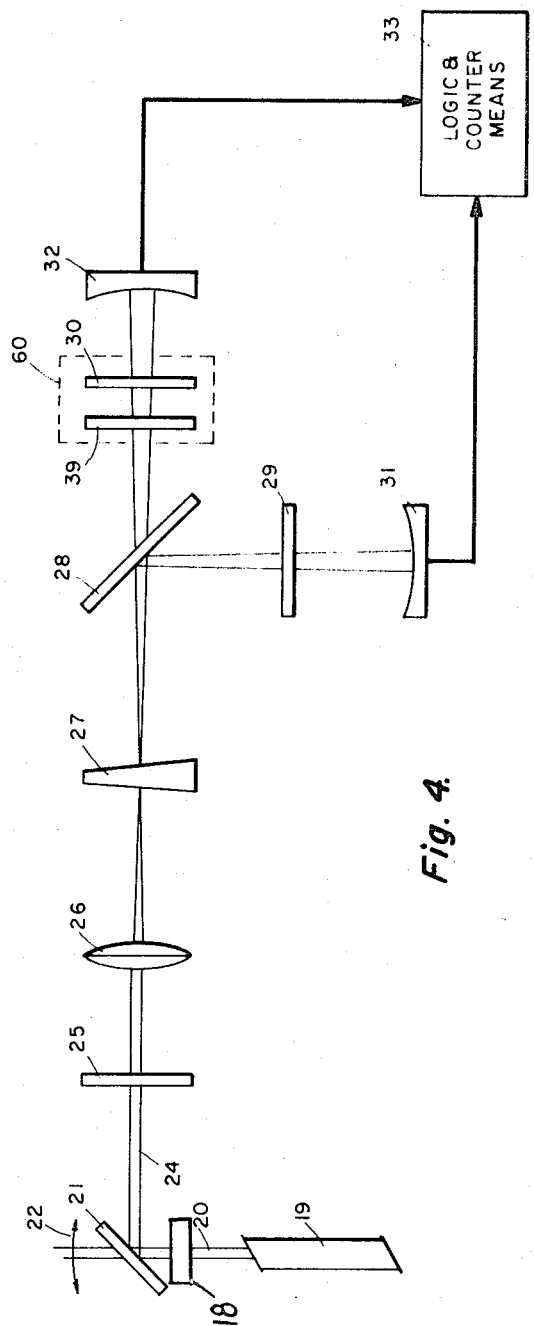

INVENTOR.
CARL F. BUHRER
BY R. J. Frank
ATTORNEY.

LIGHT BEAM DEFLECTION SENSOR

BACKGROUND OF THE INVENTION

This invention relates to deflection sensors and in particular to an apparatus for detecting the deflection of a highly collimated beam of light.

There are various known techniques for spatially deflecting a beam of light. Systems which employ mechanically driven mirrors or electro-optic crystals to achieve deflection are among the most common. Optical systems for precisely deflecting a highly collimated beam of light, such as a laser beam, have become increasingly important. For example, deflected or "steered" laser beams are presently used to expose tiny microphotographic patterns during integrated circuit manufacture.

In optical deflection systems it is often desirable to have an electrical signal which continuously indicates the position of the deflected beam. This signal can be used to monitor the performance of the deflector or to operate a feedback system for controlling the deflector. A deflection indicator which can produce digital output signals is especially desirable in systems which use a computer to control the optical deflector system. The above-mentioned microphotography application is, for example, particularly suited to computer control due to the requirements of high precision and large volume associated with integrated circuit manufacture.

A known deflection sensing scheme which produces a digital output signal employs precisely ruled gratings (called Ronchi rulings) which consist of alternately transparent and opaque regions or stripes. A sample of the deflected beam is focused on one of these ruled gratings and a photodetector is placed behind the grating. As the beam is deflected, the opaque stripes periodically interrupt the reception of light by the photodetector. The photodetector output is, therefore, a series of pulses which can be counted to determine the magnitude of the beam deflection. By using two Ronchi rulings (and associated photodetectors) operating out of phase with each other, the direction as well as the magnitude of deflection can be determined by adding and subtracting pulses.

A system which employs Ronchi rulings, is, however, limited by the attainable degree of alignment of the rulings, and is susceptible to false pulse counts due to imperfections in the ruled stripes. The transmission characteristics of the Ronchi ruling also limits system performance since the transmission should ideally go from completely transparent to completely opaque at the stripe boundaries. This condition is difficult to achieve in practice when the stripes must be very close together to attain a high degree of deflection sensing accuracy.

BRIEF SUMMARY OF THE INVENTION

The present invention is directed to a deflection sensing system which produces digital output signals without the need for precision ruled gratings. According to the present invention, apparatus is provided for measuring the deflection of a collimated beam of light having a component of plane polarization. A wedge of birefringent material is disposed in the path of the beam. The wedge varies substantially linearly in thickness in the direction of deflection of the light beam. As the light beam passes through the wedge it becomes elliptically polarized with the degree of elliptical polarization imparted by the wedge varying as a function of the wedge thickness along the line of passage of the light beam. After the light beam passes through the wedge, means are provided for determining the direction of change of the elliptical polarization rotational sense of the light beam emerging from the wedge. Means are further provided for counting the cycles of elliptical polarization which occur in the light beam emerging from the wedge.

In one embodiment of the invention the elliptical polarization of the light beam emerging from the wedge is converted to plane polarization. The plane of polarization of the converted beam is at an angle which varies proportionally to the degree of elliptical polarization which was imparted to the light beam as it passed through the wedge. Detection means are then provided for detecting changes in the angle of polarization of the converted beam and for producing digital output signals indicative of such changes.

The brief introduction to the present invention will be more fully understood and further objects and advantages will become apparent from a study of the following description in connection with the drawings, wherein:

BRIEF SUMMARY OF THE DRAWINGS

FIG. 1 is a schematic diagram of a deflector in accordance with one embodiment of the invention.

FIG. 4 is a schematic diagram of another embodiment of the invention.

DESCRIPTION OF THE PREFERRED EMBODIMENTS

Figure 2:
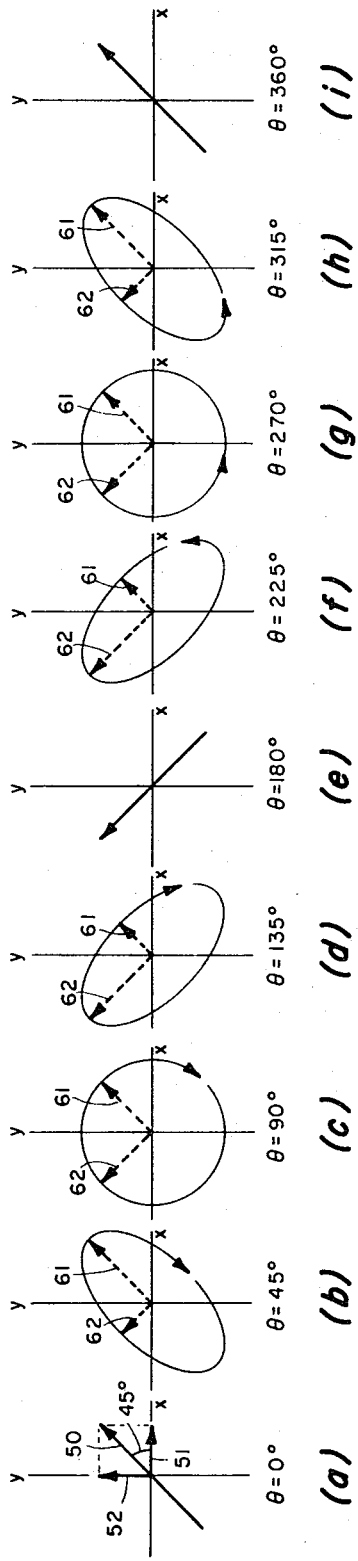
FIGS. 2(a)-2(i) illustrate polarization states of light which are useful in explaining the operation of the invention.

Referring now to FIG. 1 there is shown a system in accordance with the present invention for sensing the deflection of a collimated beam of light 20. A conventional beam deflecting means 18 is positioned in the path of the beam of light 20. The direction of deflection of the beam 20 is depicted by arrows 22. Light beam 20, which may be, for example, the output beam of a laser 19, is incident upon beam splitter 21 which separates a sampled beam 24 from the main beam 20. Polarizer 25 is positioned in the path of sampled beam 24 and plane polarizes beam 24 at a polarization angle of 45° with respect to the $x$-axis (in the $x$, $y$ plane) as defined by orthogonal coordinate axes 40. (In FIG. 1 the $x$-axis is perpendicular to the plane of the paper. All polarization angles recited hereinafter are taken with respect to the $x$-axis unless otherwise stated.) Polarizer 25 may be omitted from the system if the beam 20 is plane polarized light as would generally be the case for a laser beam. Lens 26 focuses the beam 24 on birefringent wedge 27 which has a variable width $w$ that is tapered in the $y$-direction, the direction of deflection of sampled beam 24. Wedge 27, which may be, for example, calcite crystal, is oriented with its principal axes at angles of 45° to the direction of polarization of the beam 24; i.e., with its principal axes parallel to the $x$ and $y$ directions as defined by coordinate axes 40.

The state of polarization of the beam 24 after it has passed through wedge 27 is explained with the aid of FIG. 2. FIG. 2(a) depicts the polarization vector 50 of light beam 24 just before it enters the wedge 27. The angle of polarization of the beam is 45° with respect to the $x$ axis and, therefore, the polarization vector 50 can be represented by $x$ and $y$ component vectors 51 and 52 which are of equal magnitude and in time phase with each other. As the beam 24 passes through birefringent wedge 27 a phase difference is introduced between the component vectors 51 and 52 which are respectively parallel to the two principal axes of birefringent wedge 27. This time-phase difference, $\theta$, is a function of the thickness of the wedge, $w$, along the line of passage of beam 24 and can be expressed by the equation $$\theta = (2\pi w/\lambda)(n_e - n_o),$$

where $\lambda$ is the wavelength of the light beam 24, and $n_o$ and $n_e$ are, respectively, the ordinary and extraordinary indices of refraction of the crystal comprising the wedge 27. As the beam 24 is deflected in the $y$-direction, the width $w$ will either increase or decrease depending on the polarity of the deflection. FIGS. 2(b) through 2(i) show the polarization states of the light beam 24 for different values of $\theta$ as $\theta$ changes through 360° in 45° increments. Generally, the beam emerging from wedge 27 is elliptically polarized with the degree of elliptical polarization (defined herein as the angle $\theta$) dependent upon the wedge thickness along the line of passage of the beam 24. The circular and plane polarization states shown in FIGS.

2(c), 2(e), 2(g) and 2(i) are special cases wherein $\theta$ is a multiple of $\pi/4$. From the equation above it is seen that $\theta$ passes through a full cycle of elliptical polarization (360°) for a beam deflection excursion in which $w$ changes by an amount equal to $\lambda/(n_e-n_o)$ Referring again to FIG. 1, a quarter-wave plate 39 is positioned in the path of the beam 24 emerging from the birefringent wedge 27. The quarter-wave plate 39 has its principal axes at angles of 45° to the principal axes of birefringence of the wedge 27; i.e. at angles of 45° and 135° with respect to the x-axis. This means that light passing through plate 39 which has polarization components at angles of 45° and 135° will experience a quarter-wave relative phase shift between such components. It can therefore be shown that the light emerging from plate 39 will be plane polarized with an angle of polarization that is proportional to $\theta$, the degree of elliptical polarization imparted by wedge 27. FIG. 3(b) through 3(i) illustrate this result by showing the respective polarization states of the light emerging from plate 39 for each value of $\theta$ considered in FIGS. 2(b) through 2(i).

Refer now, for example, to FIG. 2(b) taken in conjunction with FIG. 3(b). The elliptical polarization depicted in FIG. 2(b) can be represented by two plane polarization vectors 61 and 62 which are oriented at angles of 45° and 135° respectively and are 90° out of time-phase with each other. After passage through quarter-wave plate 39, however, vectors 61 and 62 are phase shifted by a quarter-wave (90°) with respect to each other and, as a result, are in time-phase with each other. The polarization state of the light output of plate 39 can therefore be obtained, as shown in FIG. 3(b), by vectorially adding in-phase vectors 61 and 62 to obtain resultant vector 63. Vector 63, representative of the plane polarized output of quarter-wave plate 39, is oriented at an angle $\alpha$ with respect to the 45° angle of polarization of the beam input to wedge 27 (as shown in FIG. 2(a). It can be shown that $\alpha$ is equal to $\theta/2$ so that in the present example $\alpha$ equals 22.5° as indicated in FIG. 3(b). The orientations of the polarization vectors shown in FIGS. 3(c) through 3(i) are obtained by the same procedure as that used to calculate the orientation of vector 63 in FIG. 3(b).

Figure 3:
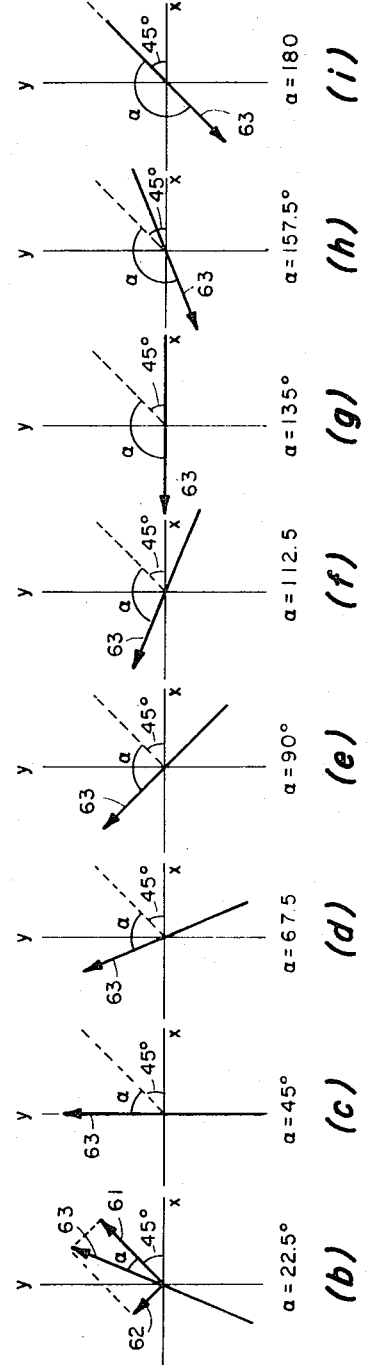
FIGS. 3(b)-3(i) also illustrate polarization states of light which aid in explaining the operation of the invention.

It is helpful at this point to summarize the operation of the present invention up to the point where the deflected sampled beam 24 emerges from the quarter-wave plate 39 (FIG. 1). As the sampled beam 24 is monotonically deflected in the y-direction it passes through either a continuously decreasing or a continuously increasing thickness of wedge 27 depending upon whether the polarity of the deflection direction is positive or negative. The light output from wedge 27 will therefore contain a continuously changing degree of elliptical polarization (a changing of $\theta$ as shown in FIG. 2). The direction of change of the rotational sense of this elliptical polarization determines the polarity of the deflection. In other words, the polarity of the deflection can be found by observing whether the elliptical polarization depicted in FIG. 2 is changing from left to right in the Figure (i.e., from FIG. 2(a) towards FIG. 2(i) or from right to left (i.e., from FIG. 2i) towards FIG. 2(a). The quarter-wave plate 39 converts the elliptically polarized light which it receives to plane polarized light having a continuously rotating polarization direction (a changing of $\alpha$ as shown in FIG. 3). The direction of rotation of $\alpha$ will thus depend upon the polarity of beam deflection and will reverse when the deflection direction reverses.

After the sampled beam 24 emerges from quarter-wave plate 39 the number of rotations of its polarization direction as well as the direction of said rotations must be detected in order to determine the net magnitude and polarity of the deflection of the beam 24. The beam 24 is passed through beam splitter 28 and divided into two separate beams. One of the beams is passed through plane polarizing filter 29 and received by photodetector 31. The other beam is passed through plane polarizing filter 30 and received by photodetector 32. The filters 29 and 30 have their polarization axes oriented so that when one filter completely passes or absorbs the beam passing through it, the other passes only part, for example half, of its incident intensity. This is accomplished by orienting the filter polarization axes at angles of 45° with respect to each other. When Each beam 24 is deflected in one direction each of the photodetector outputs will be a series of sinusoidal pulses. Each rotation of the vector 63 in FIG. 3 will correspond to one pulse with the number of pulses determining the magnitude of deflection.

The output signals of the photodetectors 31 and 32 will, however, be out of phase by 90° due to the difference in orientation of their respective filters. These out-of-phase signals are compared, as is well known in the art, to logically resolve the direction of beam deflection. This function is performed by logic and counter means 33. Means 33, which is coupled to the outputs of photodetectors 31 and 32, determines the lead-log relationship between the out-of-phase photodetector output signals. This relationship depends upon the direction of rotation of vector 63 and, therefore, resolves the direction of deflection. Means 33 also incorporates a counter which counts pulses by either adding or subtracting them in accordance with the directional determination. The net deflection at any time is represented by the digital output count of means 33 with, for example, a positive count indicating a net positive y-deflection and a negative count indicating a net negative y-deflection. Logic and counter means 33 may be, for example, a Hewlett Packard type 5280A counter used in conjunction with a Hewlett Packard type 5285A plug-in logic unit.

It will be appreciated that variations in the system as described can be made without departing from the scope of the invention. For example, in FIG. 4 the quarter-wave plate 39 is placed between the beam splitter 28 and the plane polarizing filter 30. For explanatory purposes, this configuration can be understood with reference to FIG. 1 by visualizing plate 39 of FIG. 1 as being replaced by a pair of quarter-wave plates each of which is positioned between the beam splitter 28 and one of the plane polarizing filters 29 and 30. Now, if the plane of polarization of filter 29 is oriented parallel to one of the principal axes of the quarter-wave plate associated with it (i.e., at an angle of 0° or 90°), it is seen that this quarter-wave plate serves no function in the system and can be removed. The resulting configuration is that shown in FIG. 4. The filter 39 should be oriented at 45°, in which case the combination of the remaining plate 39 and filter 30 will comprise a circular analyzer 60 as is well known in the art.

The invention as described will detect the deflection of a light beam in one dimension but two-dimensional detection can be readily achieved by resplitting the sampled beam and employing a second detection system in accordance with the invention.

It is to be understood that the invention is not limited to the specific embodiments herein described, but may be made in other ways without departure from its spirit as defined by the claims which follow.

What is claimed is:

1. Apparatus for measuring the deflection of a collimated beam of light having a component of plane polarization comprising:

a. a wedge of birefringent crystal positioned in the path of said beam, said wedge varying in thickness in the direction of deflection of said beam, said wedge splitting said component of plane polarized light into first and second components having a time-phase difference therebetween which is a function of the thickness of said wedge along the line of passage of said beam, said phase difference undergoing a number of cycles of change as said beam is deflected;

b. means optically coupled to the light beam emerging from said wedge for determining the cumulative number of cycles of change of said phase difference, said cumulative number of cycles of change of said phase difference corresponding to the deflection of said beam.

2. The deflection measuring apparatus as defined by claim 1, wherein the principal axes of said birefringent crystal are at angles of 45° with respect to the plane of polarization of said light beam.

3. Apparatus for measuring the deflection of a collimated beam of light having a component of plane polarization comprising:
   a. a wedge of birefringent crystal positioned in the path of said beam, said wedge varying substantially linearly in thickness in the direction of deflection of said beam, said wedge imparting a degree of elliptical polarization to said beam which is a function of the thickness of said wedge along the line of passage of said beam;
   b. means for converting said elliptically polarized beam into a plane polarized beam having an angle of polarization which is proportional to the degree of elliptical polarization imparted to said beam during passage of said beam through said wedge, and
   c. detecting means for detecting changes in the angle of polarization of said converted beam.

4. The deflection-measuring apparatus as defined by claim 3 wherein the principal axes of said birefringent crystal are at angles of 45° with respect to the plane of polarization of said light beam.

5. The deflection-measuring apparatus as defined by claim 4 wherein said converting means is a quarter-wave plate positioned to receive the light beam emerging from said wedge.

6. The deflection-measuring apparatus as defined by claim 5 wherein one of the principal axes of said quarter-wave plate is oriented parallel to the plane of polarization of said light beam.

7. The deflection-measuring apparatus as defined by claim 6 wherein said detecting means includes:
   a. a beam splitter positioned to receive the light beam emerging from said quarter-wave plate and divide said beam into first and second split beams;
   b. first and second plane polarizing filters respectively positioned to receive said first and second split beams;
   c. first and second photodetectors respectively positioned to receive the light emerging from said first and second plane polarizing filters, and
   d. means for comparing the outputs of said first and second photodetectors.

8. Apparatus for measuring the deflection of a collimated beam of light comprising:
   a. a first beam splitter for splitting said light beam into primary and sampled light beams;
   b. a plane polarizer positioned in the path of said sampled beam;
   c. a focusing lens positioned to receive the sampled beam emerging from said plane polarizer;
   d. a wedge of birefringent crystal positioned to receive the sampled beam emerging from said lens, said wedge varying substantially linearly in thickness in the direction of deflection of said sampled beam, said wedge imparting a degree of elliptical polarization to said sampled beam which is a function of the thickness of said wedge along the line of passage of said sampled beam;
   e. a quarter-wave plate positioned to receive the elliptically polarized beam emerging from said wedge, said plate converting said elliptically polarized beam into a plane polarized beam having an angle of polarization which is proportional to the degree of elliptical polarization imparted to said sampled beam during passage of said sampled beam through said wedge;
   f. a second beam splitter positioned to receive the plane polarized sampled beam emerging from said quarter-wave plate and divide said beam into first and second split beams;
   g. first and second plane polarizing filters respectively positioned to receive said first and second split beams;
   h. first and second photodetectors respectively positioned to receive the light emerging from said first and second plane polarizing filters, and
   i. means for comparing the outputs of said first and second photodetectors.

9. The deflection-measuring apparatus as defined by claim 8 wherein the principal axes of said birefringent crystal are at angles of 45° with respect to the plane of polarization of said plane polarizer and one of the principal axes of said quarter-wave is oriented parallel to the plane of polarization of said plane polarizer.

10. Apparatus for measuring the deflection of a collimated beam of light comprising:
    a. a first beam splitter for splitting said light beam into primary and sampled light beams;
    b. a plane polarizer positioned in the path of said sampled beam;
    c. a focusing lens positioned to receive the sampled beam emerging from said plane polarizer;
    d. a wedge of birefringent crystal positioned to receive the sampled beam emerging from said lens, said wedge varying substantially linearly in thickness in the direction of deflection of said sampled beam, said wedge imparting a degree of elliptical polarization to said sampled beam which is a function of the thickness of said wedge along the line of passage of said sampled beam;
    e. a second beam splitter positioned to receive the elliptically polarized beam emerging from said wedge and divide said beam into first and second split beams;
    f. a circular analyzer positioned to receive said first split beam;
    g. a plane polarizing filter positioned to receive said second split beam;
    h. first and second photodetectors respectively positioned to receive the light emerging from said circular analyzer and said plane polarizing filter, and
    i. means for comparing the outputs of said first and second photodetectors.

11. The deflection-measuring apparatus as defined in claim 10 wherein the principal axes of said birefringent crystal are at angles of 45° with respect to the plane of polarization of said plane polarizer and one of the principal axes of said quarter-wave plate is oriented parallel to the plane of polarization of said plane polarizer.

* * * * *